United States Patent Office 2,775,984
Patented Jan. 1, 1957

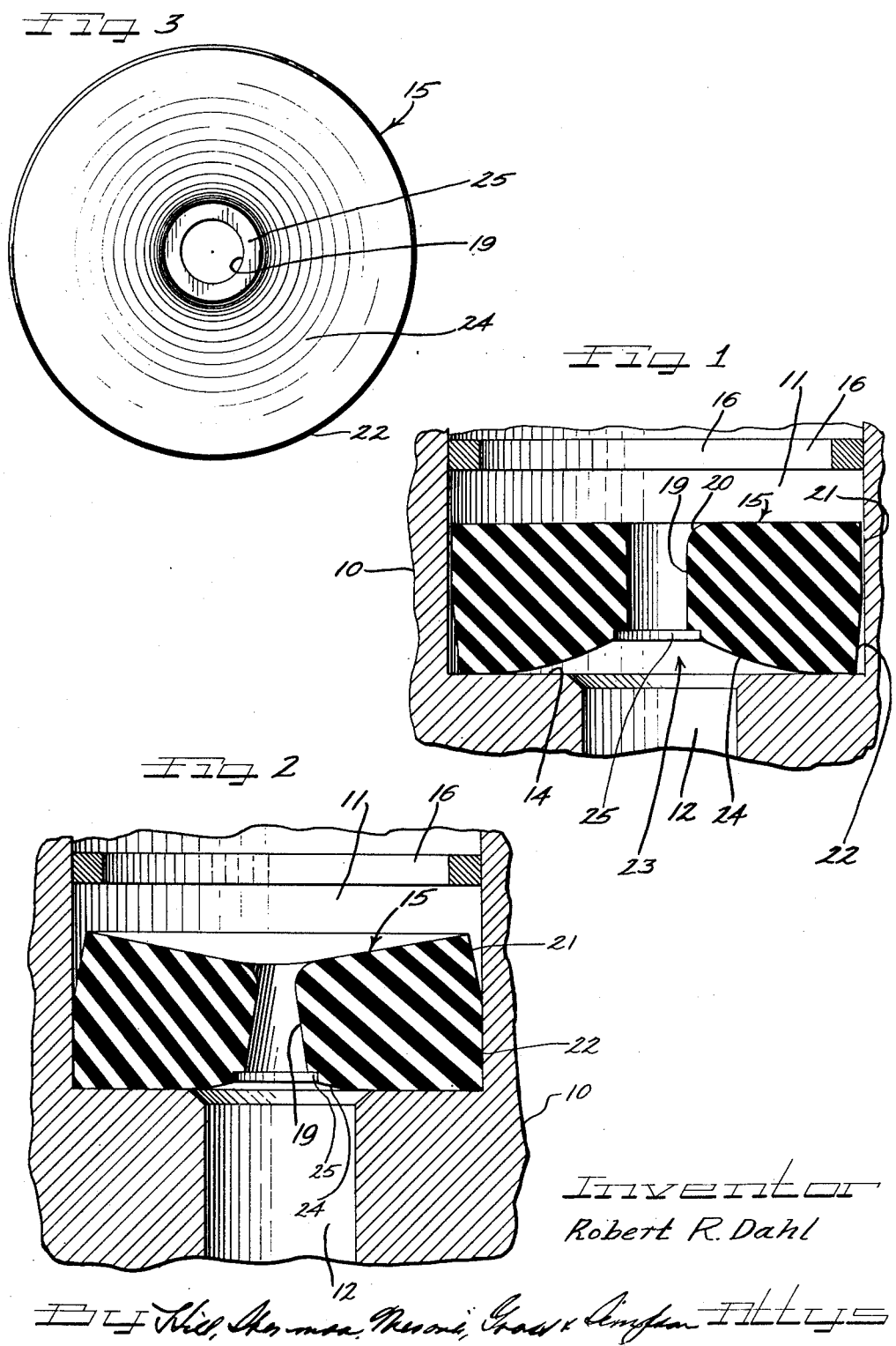

2,775,984
FLOW CONTROL STRUCTURE

Robert R. Dahl, Chicago, Ill., assignor to The Dole Valve Company, Chicago, Ill., a corporation of Illinois Application October 30, 1953, Serial No. 389,210

2 Claims. (Cl. 138—45)

This invention relates to improvements in flow control devices for maintaining a substantially constant rate of fluid flow over a wide range of pressure variations.

A principal object of my invention is to provide an improved form of annular flow control means in which flow control is attained with no deformation of the flow control means into its seat.

Another object of my invention is to provide a more efficient form of resilient annular flow control member than formerly, providing a uniform flow rate within a wide range of pressures, in which the control of the flow of fluid is enhanced by flexure of the central body portion of the flow control member upon pressure variations, with no deformation of a flow control member beyond either face thereof.

A further object of my invention is to provide a novel and improved form of resilient annular flow control member in which the control of the flow of fluid is obtained without deformation of the member into its seat by flexure of the central portion of the member to vary the area of the flow passageway leading therethrough upon variations in pressure.

A still further object of my invention is to provide a more efficient and simpler form of annular flow control member, contoured on the downstream face thereof to effect a constant delivery rate through said flow control member for a wide range of pressure variations without deformation of the flow control member beyond either face thereof.

Still another object of my invention is to provide a more flexible and accurate flow control washer than formerly wherein the side walls of the washer are beveled inwardly toward the axis thereof in a downstream direction and wherein the downstream face of the washer is contoured in the form of the frustum of a cone forming a recess therein accommodating the flow of the material of the washer thereinto and flexure of the central portion of the washer, to reduce the passage therethrough upon increases in pressure, and to avoid axial movement of the washer into its seat.

These and other objects of my invention will appear from time to time as the following specification proceeds and with reference to the accompanying drawings wherein:

Figure 1 is a cross-sectional view taken through a fluid flow passageway, showing a flow control member constructed in accordance with my invention in the passageway in a relaxed condition, with no fluid pressure on the flow control member;

Figure 2 is a view somewhat similar to Figure 1, but showing the flow control member in a flexed condition, effected by the pressure of the fluid acting thereon; and Figure 3 is a bottom plan view of the flow control member shown in Figure 1.

In the embodiment of my invention illustrated in the drawing, I have shown a portion of a casing 10 which may be a valve body, a conduit or the like. The casing 10 is shown as having an enlarged diameter passageway 11 leading therethrough for a portion of the length thereof, and terminating into a reduced diameter axially aligned passageway 12 which may be connected with a valve or a fluid delivery pipe.

At the junction of the enlarged diameter passageway 11 with the reduced diameter passageway 12 is a shoulder 14 of relatively large cross-sectional area compared with the cross-sectional area of the outlet passageway 12. Said shoulder is shown as forming a seat for a resilient annular flow control member 15. Spaced from the upstream side of the flow control member 15 is a retaining ring 16, which may be a snap ring and may be snapped into position in the inlet passageway 11, to retain the flow control member 15 to the seat 14. The retaining ring 16 is shown as being spaced from the shoulder 14 to accommodate freedom of movement of said flow control member between said seat and retaining ring.

The annular flow control member 15 controls the flow by reduction in the cross-sectional area of its orifice upon increases in pressure thereon on the same general principles as are disclosed in Patent No. 2,454,929, which issued to L. A. Kempton on November 30, 1948. The flow control member 15 may be made from a resilient or elastic material, such as rubber or one of the well known substitutes for rubber, such as "neoprene," and the like, so as to be readily flexible in a downstream direction upon increases in the pressure of fluid acting thereon.

The flow control member 15 is shown as having a central opening or orifice 19 leading therethrough, axially aligned with the outlet 12 and of a smaller cross-sectional area than the cross-sectional area of the outlet 12.

It should here be understood that the cross-sectional area of the orifice 19 may be varied for varying flow conditions and that with the present form of my invention it may be of the same cross-sectional area as the cross-sectional area of the outlet 12, since it does not flex into said outlet.

The flow control member 15 is also shown as having a uniformly contoured shoulder 20 leading to the orifice 19 to provide a uniform relatively smooth orifice for all degrees of flexure of said flow control member. The flow contrl member 15 also has an outer wall 21 loosely fitting within the passageway 11 and having an inwardly tapered lower end portion 22, tapering inwardly to provide a space between the wall of the passageawy 11 into which the flow control member 15 may flex upon increases in pressure acting on the upstream face of said flow control member.

The downstream side of the flow control member 15 is shown as being cut out or contoured inwardly from the margin thereof, to form a concave recess 23 having a generally frusto-conical face 24 extending from a location close to the outer margin thereof, and engaging the shoulder 14 a substantial distance outwardly from the outer margin of the reduced diameter passageway 12. As herein shown the frusto-conical wall 24 terminates into an annular shouldered recess 25 at the downstream side of the orifice 19.

It may be seen from Figure 2, that as the pressure of fluid acts on the upstream face of the flow control member 15, the flow control member flexes in the direction of the flow of fluid through the orifice 19, and that the cross-sectional area of said orifice will be reduced on the upstream side thereof by flexure of the flow control member at the central portion thereof. As the pressure increases the downstream frusto-conical face of said flow control member will move into engagement with the shoulder 24 and the tapered outer wall 22 of the flow control member will flex outwardly into engagement with the wall of the passageway 11.

In Figure 2 the flow control member 15 is shown in an extreme deformed position for maximum pressure conditions. It is, of course, obvious that the extent of deformation of flow control member 15 depends upon the pressure drop across the orifice 19 and that the greater the pressure drop the greater the deformation of said flow control member. It will be observed, however, that in all positions of deformation of the flow control member 15, that the orifice is spaced from the inlet side of the reduced diameter passageway 12, so as to avoid interference of said flow control member with said passageway making it unnecessary to accurately machine said passageway at its inlet side and thus avoiding the need for an accurate seat for the flow control member, and enabling the diameter of the flow control orifice to be of the same diameter as the outlet passageway 12, if desired.

It should be understood from the foregoing that with the flow control member of my invention, that the downstream side of the flow control member and orifice leading therethrough is always spaced from the reduced diameter inlet passageway and shouldered seat for the flow control member, and that the control of the flow is effected by flexure of the central portion of the flow control member without axial movement of the flow control member beyond its shouldered seat or into its inlet passageway.

It will be understood that modifications and variations may be effected without departing from the scope of the novel concepts of the present invention.

I claim as my invention:

1. A flow control device comprising a casing having a passageway therethrough, the passageway having a flat annular shoulder of substantial width facing in an upstream direction, a resilient flow control member loosely carried in said passageway and seating against said shoulder, the member having a flat face facing in an upstream direction, an outer wall portion generally parallel to the wall of said passageway, a central flow orifice leading therethrough from said flat face, and having a uniformly contoured generally frusto-conical recessed downstream face concentric with said flow orifice and facing said shoulder and having engagement with said shoulder adjacent the outer margin thereof a substantial distance outwardly from the inner margin of said shoulder, and so proportioned as to flex inwardly into engagement with said shoulder and move inwardly along said shoulder to the inner margin thereof and form a substantially flat downstream face in engagement with said shoulder upon certain predetermined increases in pressure on said flow control device, and to flex radially inwardly upon engagement of said contoured face with the entire area of said shoulder with no axial deformation to gradually reduce the cross-sectional area of said orifice and maintain a substantially uniform flow rate through said orifice over a wide range of increases in pressure on said flow control device.

2. In a fluid flow control device, a casing having a relatively large diameter inlet passageway, a reduced diameter axially aligned discharge passageway concentric with said inlet passageway, a flat shoulder of substantial width at the junction of said passageways, a resilient annular flow control member carried in said enlarged diameter passageway and of a smaller diameter than said passageway for engagement with said shoulder by the pressure of fluid thereon, said flow control member having a flat face on its upstream side uniformly curving at its inner margin into a central flow control orifice defined by the inner margin of said flow control member, an outer margin having a wall portion generally parallel to the wall of said passageway and tapering inwardly toward said shoulder, and having a contoured frusto-conical recessed face on the downstream side of said flow control member engaging said shoulder adjacent the outer margin thereof and uniformly converging inwardly from said shoulder to said orifice and terminating adjacent said orifice in spaced relation with respect to said shoulder in an upstream direction and concentric with said orifice, whereby increases in pressure on the upstream face of said flow control member will effect a reduction in cross-sectional area of said orifice by flexure into engagement with and movement inwardly along said shoulder to form a substantially flat downstream face upon predetermined increases in pressure on said flow control member and to then further reduce the cross-sectional area of said orifice by radial inward flexure of said flow control member upon certain additional increases in pressure, without moving said member axially into said outlet passageway.

References Cited in the file of this patent

UNITED STATES PATENTS

| 2,389,134 | Brown | Nov. 20, 1945 |
| 2,454,929 | Kempton | Nov. 30, 1948 |
| 2,489,542 | Rosenblum | Nov. 29, 1949 |
| 2,568,519 | Smith | Sept. 18, 1951 |
| 2,572,244 | Chace | Oct. 23, 1951 |
| 2,662,554 | Singer | Dec. 15, 1953 |
| 2,667,900 | Cantalupo | Feb. 2, 1954 |

FOREIGN PATENTS

| 154,109 | Switzerland | July 1, 1932 |